United States Patent Office 3,278,199
Patented Oct. 11, 1966

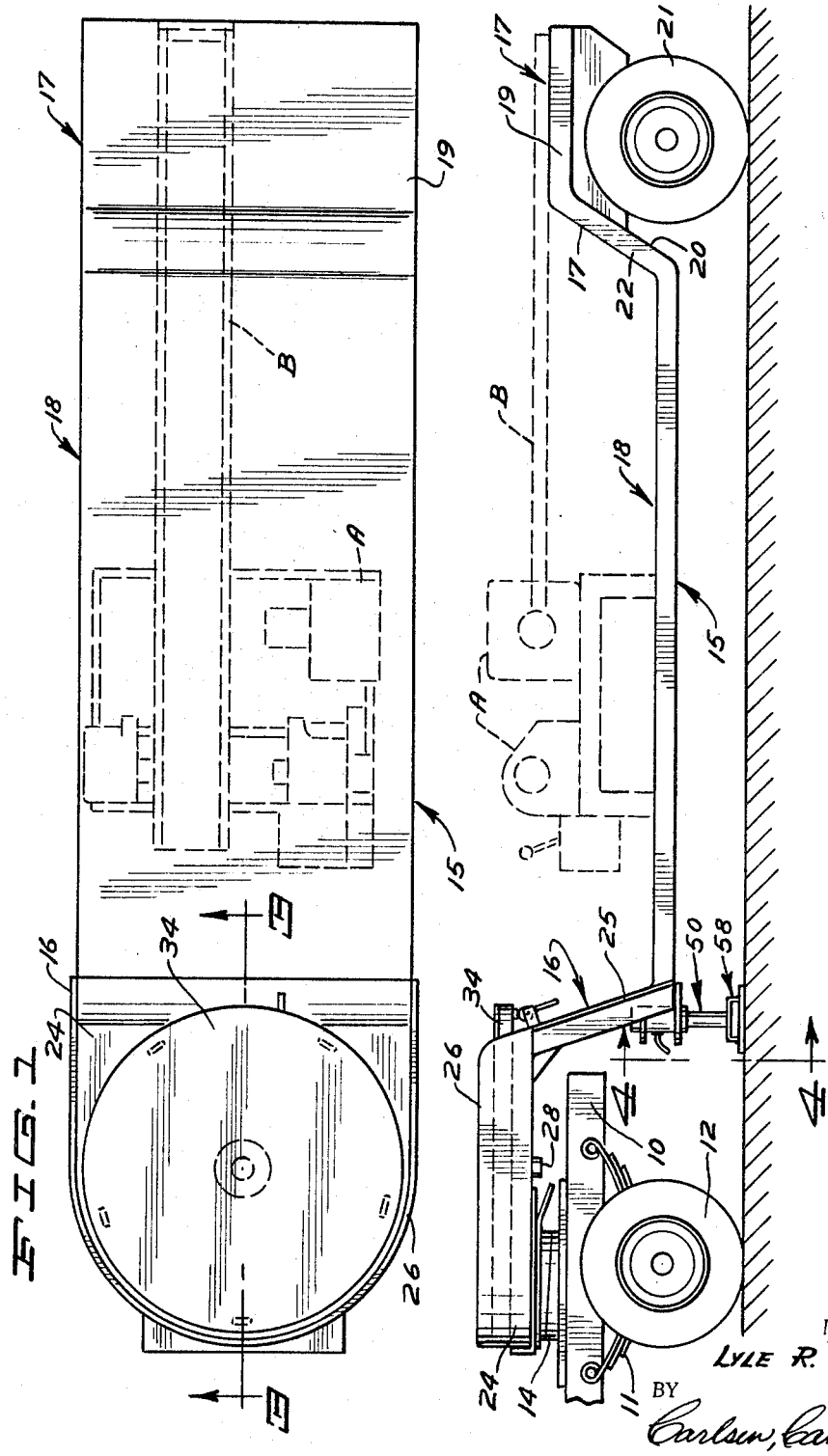

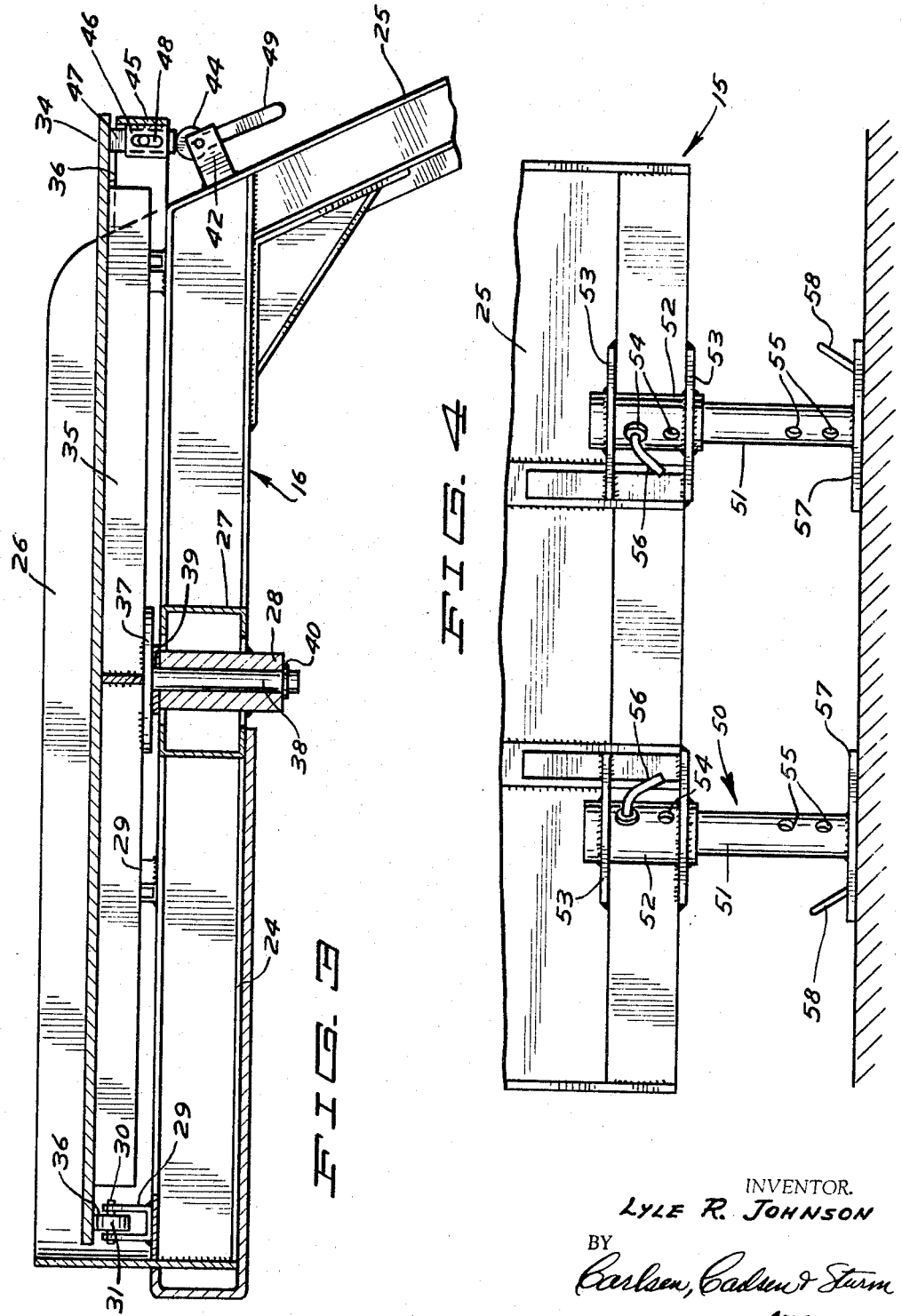

3,278,199
TRAILER FOR MOUNTING TRACK PRESS
Lyle R. Johnson, St. Louis Park, Minn., assignor to Rodgers Hydraulic Incorporated, Minneapolis, Minn., a corporation of Minnesota
Filed Nov. 6, 1964, Ser. No. 409,475
4 Claims. (Cl. 280—423)

This invention relates generally to trailers and particularly concerns a draft trailer for mounting and transporting a track press.

Track presses are used to disassemble and reassemble crawler tracks to replace or rotate component parts of the track in the repair thereof. It is frequently desirable to transport the press to the site of the crawler track or tracks to be repaired and this is best accomplished by mounting the relatively heavy press on a wheeled trailer to be pulled to the site by a suitable draft vehicle. During the repair operation the track is disassembled into various independent components such as pins, bushings, links, grousers, nuts and bolts which must be kept nearby for the reassembly operation.

The primary object of the present invention is to provide a transport trailer for a track press which trailer has a conveyor support means on one end and a rotary component supporting rack at the other end to facilitate use of a press mounted therebetween.

With this and other objects in view the invention broadly comprises an elongated trailer having a low elevation longitudinally central bed portion, a raised rear end portion having ground wheels disposed thereunder, a raised front end portion for attachment to a draft vehicle, a circular shelf or platform journaled on one end portion for rotation about its center axis on a horizontal plane spaced above the plane of the central or bed portion whereby as a track press is mounted for use on the central portion the shelf might be conveniently used by the operator for temporary storage of the track components.

The above mentioned and additional objects of the invention will be brought to light during the course of the following specification, reference being made to the accompanying drawings, in which—

FIG. 1 is a plan view of the trailer showing the normal mounted position of a track press and conveyor in broken lines.

FIG. 2 is a side elevation of the trailer, carrying a press again shown in broken lines, with the trailer connected in draft relation to a vehicle and with the front end support jacks in lowered position.

FIG. 3 is a longitudinal vertical section through the front end portion of the trailer taken on line 3—3 of FIG. 1.

FIG. 4 is a front elevation of the support jacks taken on line 4—4 of FIG. 2 and looking in the direction of the arrows.

Referring now more particularly to the drawings reference characters will be used to denote like parts or structural features in the different views. The numeral 10 (FIG. 2) denotes the rear end portion of a draft vehicle having rear springs 11 and supporting rear wheels 12. On the vehicle portion 10 there is disposed a suitable mount 14 for connecting the trailer, designated generally at 15, in draft relation thereto.

Trailer 15 has an elevated front end portion 16 and an elevated rear end portion 17 which are interconnected by an elongated flat bed or central portion 18. The trailer rear portion includes a platform 19 under which there is a recess 20 and suitable means for mounting the rear ground wheels 21. A wall 22 angles downwardly from the platform 19 to connect with the rear end of the bed 18.

The front end portion 16 includes a platform 24 adapted to be connected to the mount 14. Platform 24 is connected to the front edge of the bed 18 by a slanting wall 25 which extends transversely across the trailer. The front end of platform 24 is semicircular, as shown in FIG. 1, and relatively low enclosure wall 26 extends upwardly and along the sides and around the front end of the platform. A bearing box 27 (FIG. 3) containing a bearing 28 is mounted in the center of the platform 24. Circumferentially spaced around the top of the platform and radially equidistant from the axis of bearing 28 a plurality of roller brackets 29 are welded to the platform. Each of the brackets 29 carries a pin 30 which journals a roller 31 for rotation thereon on axes which are perpendicular to the axis of bearing 28.

A circular shelf 34 has strengthening ribs 35 mounted on its underside leaving a continuous annular marginal surface 36. The rib structure is secured at its center to a plate 37 which has an integral downwardly projecting shaft 38 extending through the bearing 28. A washer 39 may be disposed between the plate 37 and bearing 28 and a pin 40 releasably holds the shaft against upward removal. It will be understood that as the shelf 34 is placed in position on the platform, as shown in FIG. 3, with the shaft 38 secured in bearing 28 the shelf surface 36 will be at rest upon the various rollers 31 so that the shelf might be freely rotated about the axis of the shaft in the manner of a Lazy Susan.

On the inner end of platform 24, adjacent its connection with the wall 25, there is mounted a bracket 42 which eccentrically journals a friction roller 44. An arcuate guard wall 45 extending between the side walls 26 just under the rear edge of shelf 34 has a housing 46 mounted thereon. A pressure block 47 is vertically slidable in the housing 46 with a guide pin riding in slot 48. Roller 44 is connected to an operating handle 49. It will be understood that when the mechanism just described is in the position shown in FIG. 3, the block 47 will be held in firm pressure engagement with the surface 36 causing a tilting pressure of the shaft 38 within its bearing to frictionally lock the shelf against rotary movement. When handle 49 is raised to rotate roller 44 about its eccentric axis, the block 47 will be lowered freeing the shaft for rotation.

A pair of support stands denoted generally at 50 are mounted on the wall 25 adjacent its juncture with the front end of bed 18. These are best shown in FIG. 4. Each support comprises a post 51 mounted within a tubular member 52 for up and down sliding movement between raised and lowered positions. The members 52 are mounted on the wall 25 as by plates 53 and are provided with apertures 54 adapted to be aligned with upper or lower apertures 55 in the post for reception of a pin 56 to hold the support in lowered position, as shown, or in a raised transport position. Each post has a ground plate 57 at its lower end which carries a handle 58 to effect the adjustment between positions.

It will be understood that the body of the trailer 15 is provided with suitable longitudinal and transverse frame structure, gusset plates and the like to give it the needed strength and rigidity for supporting and transporting a conventional track press A, conveyor B, as well as the operator and the work parts to be serviced thereon.

In use of the trailer the press A is mounted on the central area of the bed portion 18 with the track conveyor extending longitudinally onto the rear platform 19. The press operator is positioned on the bed 18 adjacent to the shelf 34 so that he has ready access to both the work table of the press and the shelf for transferring track components therebetween. During the track repair operation the locking device, namely, roller 41 and block 47, is positioned to allow free rotation of the shelf 34 so that any track components laying thereon may be brought within ready reach of the operator. Many of such parts are successively removed during track disassembly and replaced in inverse order during reassembly. The rotary shelf accordingly keeps the parts in proper order as they are successively placed in order around the shelf.

The stands 50 are used to support the front end of the trailer when it has been detached from the draft vehicle. During transport the stands are carried in their raised positions and the shelf 34 is locked.

The trailer accordingly provides a convenient vehicle for transporting a track press to and using it in the field. The trailer has a low center of gravity for safe transportation and use, and the rotary shelf provides a convenient storage place for parts.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a trailer for mounting and transporting a crawler track press, an elongated trailer body having a bed for supporting the press thereon and a platform at the front end of the bed adapted to be connected to a draft vehicle, a set of ground wheels mounted on and supporting the rear end of the trailer body, the said platform being disposed at a substantially higher elevation than the bed, and a flat circular shelf mounted on and over the platform for rotation about its center axis on a horizontal plane, said shelf extending across substantially the entire width of the trailer and having one edge extending to the area over the bed for use by an operator of the press.

2. The subject matter of claim 1 wherein a manually operative locking means is mounted on the trailer adjacent the platform for selective locking engagement with the shelf to prohibit rotation thereof.

3. The subject matter of claim 1 wherein said shelf mounting comprises a bearing mounted on the platform, an axial shaft on the shelf journaled vertically in the bearing, and a plurality of rollers mounted on the platform with their axes disposed radially with respect to said shaft and being spaced apart in an annular arrangement and equidistant from the bearing to support the marginal portions of the shelf.

4. In a trailer for mounting and transporting a track press over the ground, an elongated trailer body having front and rear platforms and a central horizontal bed portion between the platforms at a substantially lower elevation for supporting the press thereon with the press conveyor extending rearwardly onto the rear platform, a circular shelf, means supporting the shelf over the front platform for rotation on a horizontal plane about the center axis of the shelf, locking means on the front platform for selectively engaging and locking the shelf against such rotation, a set of ground wheels mounted under the rear platform, and a stand mounted on the bed portion adjacent the front platform for raising and lowering movement between an upper retracted position and a lowered position in engagement with the ground to jointly with the ground wheels support the trailer body over the ground in spaced relation thereto.

References Cited by the Examiner

UNITED STATES PATENTS

| | | | |
|---|---|---|---|
| 2,337,670 | 12/1943 | Le Tourneau | 280—62 |
| 2,572,776 | 10/1951 | Smith | 104—45 X |
| 2,821,936 | 2/1958 | Weissman | 104—45 |
| 2,878,033 | 3/1959 | Polich | 280—423 |
| 2,952,221 | 9/1960 | Hobel | 104—44 |
| 2,960,123 | 11/1960 | O'Quinn | 143—43 |

LEO FRIAGLIA, *Primary Examiner.*